Jan. 10, 1956  A. L. A. MORGEN  2,730,186
STEERING ARRANGEMENT FOR MOTOR-VEHICLES
Filed June 26, 1953  3 Sheets-Sheet 1
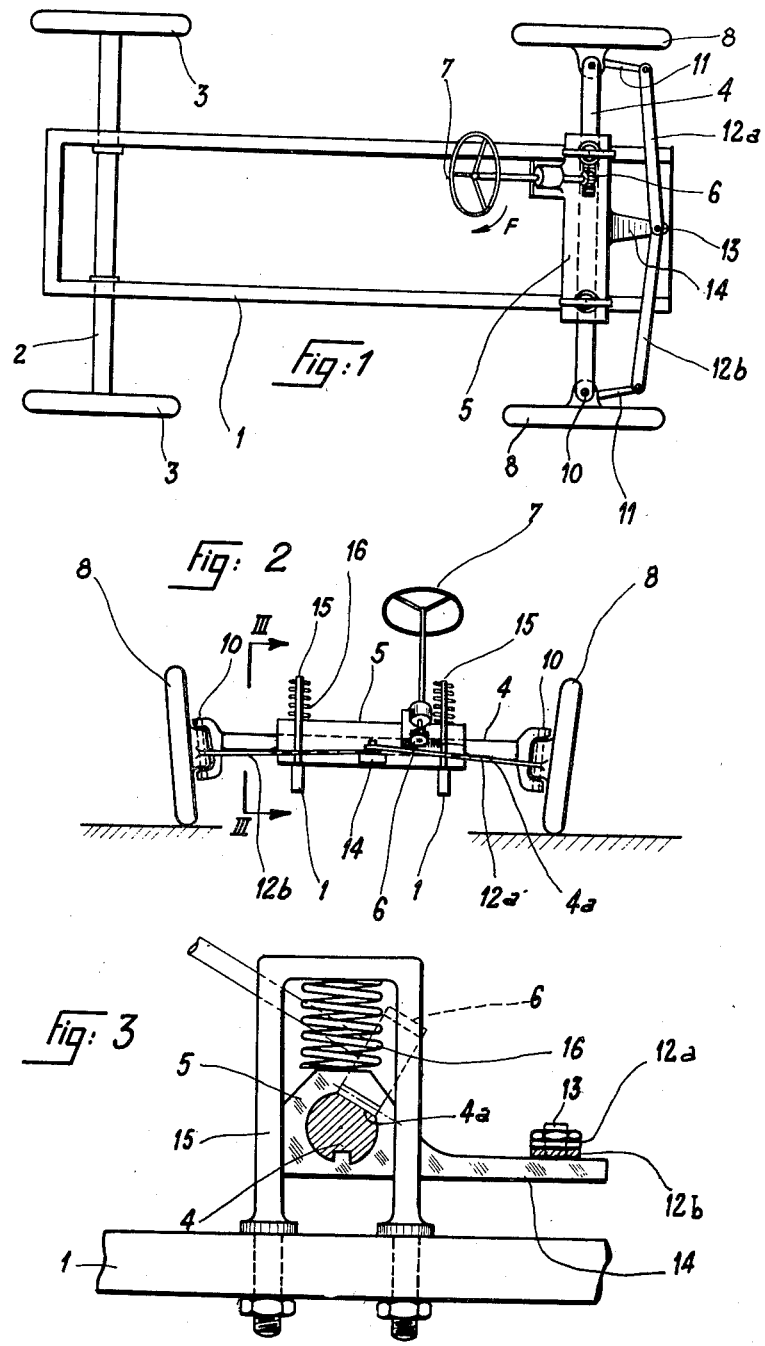
Inventor:
André L. A. Morgen
by Robert Henderson
attorney

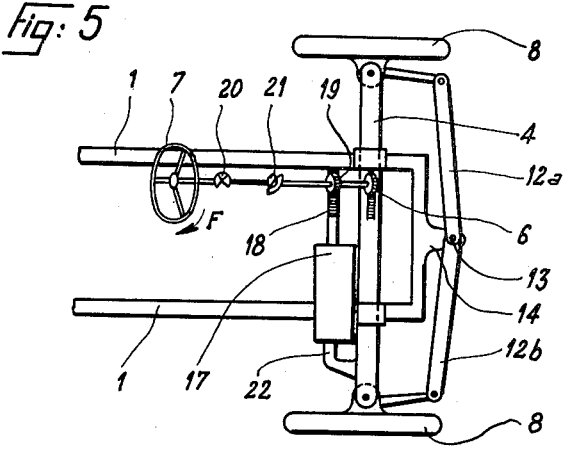
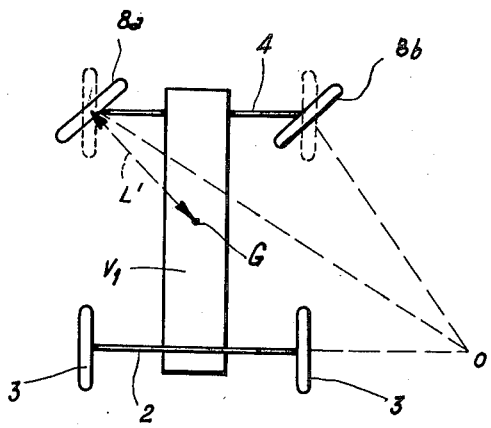
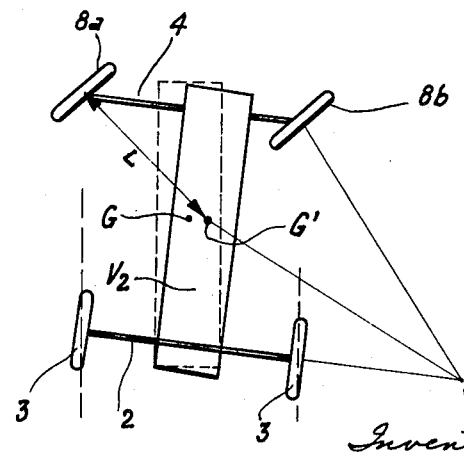

Jan. 10, 1956  A. L. A. MORGEN  2,730,186
STEERING ARRANGEMENT FOR MOTOR-VEHICLES
Filed June 26, 1953  3 Sheets-Sheet 3

United States Patent Office 2,730,186
Patented Jan. 10, 1956

2,730,186

STEERING ARRANGEMENT FOR MOTOR-VEHICLES

André L. A. Morgen, Reims, France

Application June 26, 1953, Serial No. 364,393

Claims priority, application France June 30, 1952

8 Claims. (Cl. 180—79.2)

In normal motor-vehicles the steering is effected through the front wheels which are mounted on swivelable stub axles at the ends of a fixed front axle; the two stub axles are operatively coupled together and are moved by the steering wheel. It is known that vehicles provided with this known steering system exhibit some instability when negotiating bends, the vehicle tending, under the action of centrifugal force, to be lifted on the side nearer the centre of the bend and to overturn towards the outside.

The object of the present invention is to provide a steering arrangement which is intended to increase the stability of vehicles on bends.

In accordance with the invention, the steerable front wheels are mounted on a front axle adapted to move transversely in relation to the chassis on which it is mounted when the steering wheel is turned and the said swivellable stub axles are connected to the said chassis by articulated connections, so that a transverse movement of the chassis towards one side of the front axle orients the steerable wheels to make the vehicle move towards this side.

The vehicle is thus steered by moving the whole chassis in relation to the front axle, and the arrangement is such that this movement of the chassis carries the latter towards the centre of the bend.

A number of important advantages are thereby afforded:

In the first place, since the mass of the chassis is carried towards the centre of the bend the centrifugal force tending to overturn the vehicle is correspondingly reduced. Moreover, the said mass of the chassis bears on the front wheel on the inside of the bend so as to tend to prevent it from rising and at the same time the lever arm of the moment acting on the outside wheel in opposition to the overturning force is increased. Finally, the movement of the whole chassis in relation to the front axle causes the rear wheels to turn into the bend, so that the angle between the front wheels and the rear wheels is correspondingly reduced for a bend of given radius.

The transverse movement of the chassis on the front axle can be produced, with the aid of the usual steering wheel, by means of a direct mechanical connection, for example through a rack device.

The transverse movement of the chassis in relation to the front axle may alternatively be produced through a servo-motor controlled by the steering wheel and this may be convenient because, unlike what happens in normal steering systems, the performance of a turn by the vehicle results in the centripetal displacement of the point of application of the centrifugal force, and this may be difficult to effect in the absence of a servo-motor. However, experience shows that the reduction gear usually employed in steering systems is sufficient to reduce the effort required to steer the vehicle to an acceptable value. In fact, the centrifugal force does not commence to take effect on the vehicle until a certain amount of turning movement has been applied to the wheels and consequently the driver has not necessarily to overcome this centrifugal force unless, during running, he progressively reduces the radius of the bend negotiated.

The transversely moving axle may be rectilinear. It may on the other hand be advantageous to give it the general form of an arc of a circle, the concavity of which is directed towards the front of the vehicle. This constructional form affords the following additional advantages:

(a) The displacement of the axle initiates, by itself, the turning of the wheels to the required position, so that in order to obtain a given degree of turning the amount of the transverse movement of the axle is reduced and, conversely, for the same transverse movement of the axle the radius of turn is smaller.

(b) The lever arm of the moment opposing the overturning of the vehicle is increased, while the front wheel on the inside of the bend is more highly overloaded, whereby the stability is increased.

(c) At the instant when a turn is performed, the offside front wheel of the vehicle is somewhat advanced in the direction of travel of the vehicle, while the inside wheel lags by an equal amount, which tends to increase the speed of rotation of the said outside wheel and to reduce the speed of the inside wheel, and consequently facilitates the negotiation of the bend.

The description which follows with reference to the accompanying drawings, which are given by way of non-limitative example, will enable the manner in which the invention can be carried into effect to be readily understood.

Figure 1 shows diagrammatically in plan view a vehicle equipped with a steering mechanism according to the invention.

Figure 2 shows the same vehicle in front view.

Figure 3 is a diagrammatic section on the line III—III of Figure 2.

Figure 6:
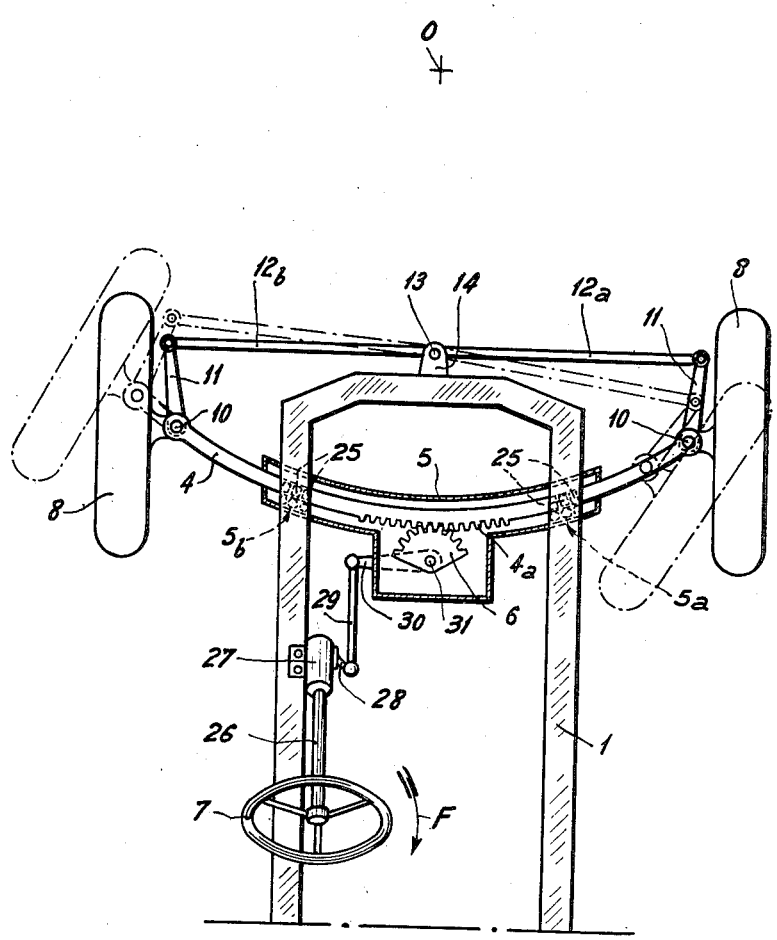

Figures 4a and 4b which show diagrammatically in plan view two vehicles, one of the normal type and the other constructed in accordance with the invention, each of which is entering a substantially similar turn, are intended to make the advantages of the invention clearly apparent.

Figure 5 shows diagrammatically in plan view a steering mechanism provided with a servo-motor.

Figure 6 shows in plan view a vehicle provided with a steering mechanism according to the invention comprising an axle in the form of an arc of a circle.

The vehicle shown in plan view in Figure 1 comprises a chassis 1 on which is mounted in the usual manner a rear axle 2 driving the wheels 3. The front axle 4 of the said vehicle is adapted to slide transversely in relation thereto. For this purpose, the said axle extends through plain bearings shown in the form of a sleeve 5 and it is provided with a rack 4a adapted to be moved by a pinion 6 rotated by the steering wheel 7. The front wheels 8 mounted in the usual manner by stub axles are adapted to turn about pins 10 diagrammatically illustrated. Each of the said wheels is associated with a steering arm 11 to which there is pivotally connected a steering rod 12a for the left-hand wheel and a steering rod 12b for the right-hand wheel, the said two rods being adapted to pivot about a pin 13 mounted, for example, on the sleeve 5 by means of a lug 14. In the constructional examples illustrated, there is only one lug 14, which is disposed on the axis of the chassis. Two lugs may alternatively be provided, in which case these two lugs will be disposed symmetrically and the two rods 12a, 12b, will be pivotally connected one on each lug. The chassis 1 is suspended on the sleeve 5, for example, through shackles 15 and compression springs 16. Any other means of suspending the chassis of the vehicle in relation to the plain bearings of the front axle 4 may obviously be employed.

The steering mechanism hereinbefore described operates in the following manner:

When the driver wishes to take a bend to the right and accordingly turns the steering wheel 7 in the direction of the arrow F, he rotates the pinion 6 in the direction of the said arrow and consequently moves the forward part of the chassis in the downward direction in the figure, along the axle 4 which remains fixed by reason of the contact of the wheels with the ground. The movement of the chassis results in a movement of the lug 14 and consequently of the point 13, and therefore in a pull on the rod 12a and a push on the rod 12b. In this movement, the two wheels 8 are obviously given a right-hand turn, as in a normal vehicle.

It will readily be seen that opposite movements would be obtained if the steering wheel were turned to the left.

In Figures 4a and 4b, which show approximately the same bend taken by a normal vehicle V₁ and by the vehicle V₂ constructed in accordance with the invention, the advantages of the latter are clearly apparent.

In the case of the vehicle V₁, which is assumed to be taking a sharp bend to the right after travelling along a straight line for some distance, the centre of gravity G of the vehicle does not change position and the tendency of the vehicle to overturn is essentially counterbalanced by the moment due to the weight of the vehicle acting on the lever arm L', that is to say, the distance from the centre of gravity to the point of contact of the outside front wheel 8a. Moreover, since no additional load is applied to the inside front wheel 8b, it tends to rise.

If the same bend is negotiated with a vehicle equipped in accordance with the invention (Figure 4b), the chassis of this vehicle, which initially occupied the position shown in chain lines, takes up the position shown in unbroken lines. In other words, in the first place, the rear wheels 3 are oriented in the direction of the bend to be negotiated, whereby the negotiation of the bend is facilitated. It may to some extent be true to say that the steering mechanism according to the invention is active on the four wheels. In addition, the centre of gravity, which was initially at G, is brought to G', that is to say, to a shorter distance from the centre of the bend. The centrifugal force acting on the vehicle is therefore reduced to the same extent. Moreover, the wheel 8b is subjected to an additional load, whereby its tendency to rise is counterbalanced and the overturning moment exerted on the vehicle is compensated for by the moment supplied by the weight of this vehicle acting this time on the lever arm L instead of the lever arm L'.

All these factors combine to impart stability to the vehicle when turning.

However, it is to be noted that in the case of a vehicle of the usual type practically no effort is made in operating the steering, since the centre of gravity G of the vehicle, to which the centrifugal force is applied as soon as the bend is started, is scarcely moved in relation to the centre of the bend. On the other hand, in the case of Figure 4b, it is necessary, in order to turn the vehicle, to move the centre of gravity from G to G', that is to say, against the certrifugal force, which necessitates effort which may be very appreciable if the vehicle is heavy and fast.

To offset this, it must be noted that the centrifugal force exerted on the vehicle tends to cause the chassis to slide in relation to the axle in the direction of the return of the vehicle to straight travel. A steering mechanism constructed in accordance with the invention is therefore stable (i. e. tends to be self-centering) without any additional means.

In order to provide the effort necessary for negotiating a bend, it may be desirable to employ a servomotor. However, some reversibility of the control of the said servomotor is desirable in order to maintain the stability of the steering.

Many means may be employed to achieve this result. By way of example, Figure 5 shows an advantageous means of solving this problem.

In this figure, the rectangle 17 represents a double-acting hydraulic servomotor. Such servomotors are well-known in practice. An example of such a servomotor is described in Swiss patent specification No. 214,257 of the 25th November 1939.

It will be recalled that a servomotor of this type comprises a cylinder containing a double-acting piston, and a control member forming a distribution valve sliding parallel to the axis of the cylinder and of the piston, the said member being adapted to unmask orifices for the admission and discharge of fluid so that the piston is forced to follow exactly the movements of the said control member without being able to react thereon.

In the constructional example of Figure 5, the sliding control member is driven by a rack 18 moved by a pinion 19 keyed on the same shaft as the pinion 6, which acts directly on the rack 4a mounted on the axle 4, as indicated in Figure 1. In order to prevent the transmission of the movements of the axle to the steering wheel 7, the steering column comprises two universal joints 20 and 21 and that part of the said column which extends to the steering wheel 7 is mounted in a bearing fast with the chassis 1.

The arrangement hereinbefore described operates in the following manner:

When the steering wheel is turned, for example, in the direction of the arrow F (right-hand turn) it drives the rack 18, through the pinion 19, and this results in an equivalent movement of the piston rod 22 of the servomotor 17. The movement of the said rod results in a movement of the axle 4 and the pinion 6 simply follows the movement of the said axle. The effort required to overcome the centrifugal force is this supplied by the servomotor 17, but the reaction of this centrifugal force is transmitted to the pinion 6 which tends to drive the pinion 19 and consequently the rack 18 in the direction of the return to straight travel. In other words, the reactions of the steering system which ensure stability are maintained.

To sum up, the driver does not supply the effort required to move the chassis against the centrifugal force, but the reaction of this effort is substantial at the steering wheel. The magnitude of the reaction transmitted to the steering wheel may be reduced by a suitable adjustment, in particular by coupling the pinions 6 and 19 with a certain freedom of movement. If the servo-motor 17 does not operate satisfactorily, the driver can control the steering and temporarily continue to drive under the same conditions as are illustrated in Figure 1. Failure of the servomotor will therefore not result in an accident.

In the embodiment illustrated in Figure 6, the axle 4 has the general form of an arc of a circle, the concavity of which is directed towards the front. The plain bearings 5a and 5b of the axle 4 are provided at the ends of the casing 5, which is shaped to correspond with the shape of the axle. In order to reduce the friction in these bearings, it is advantageous to employ roller-type bearings 25.

Since the axle is preferably of square section at the point adjacent the said bearings, the rollers 25 may be disposed on the upper and rear faces of the axle as shown in the figure. In this way, the forces due to the weight on the one hand and to the thrust of the driving wheels on the other hand are neutralized.

The remainder of the mounting of the wheels and of the steering mechanism is similar to that illustrated in Figure 1, but the steering wheel 7 is connected by a steering column 26 to a normal steering box 27, for example of the type comprising a worm and sector, mounted on the chassis 1. The lever 28 extending from the steering box has connected thereto by a ball joint the connecting rod 29 which acts on the lever 30, also through a ball joint. The said lever is keyed on the same pin as the toothed sector 6, which engages with the teeth of the rack 4a of the axle 4. The common pin 31 of the sector 6 and of the lever 30 pivots in bearings mounted on the casing 5.

In this case, the transverse movement of the axle 4 takes place along an arc of a circle of centre O. Thus, when the steering wheel is turned in the direction of the arrow F, (right-hand turn), the wheels 8 are oriented as before in the direction of the turn, but at the same time the left-hand wheel as shown in the drawing, which is on the outside of the turn, is carried forward to some extent in the direction of the forward, movement of the vehicle, while the right-hand wheel, which is on the inside of the turn, lags to the same extent.

Consequently, for imparting the turning movement to the wheels, the degree of turn—due to the transverse movement of the axle is added to the action of the articulated system. In fact, even assuming that the wheels 8 were rigidly fixed at the ends of this axle, the circular transverse movement of the latter would be sufficient in itself to provide a certain degree of turning movement. In other words, the use of an axle in the form of an arc of a circle renders the steering more effective. In addition, the wheel situated on the inside of the turn moves more towards the centre of gravity of the vehicle than in the case of Figure 4b and is consequently subjected to a greater additional load during the turn. Conversely, the outside wheel moves even further away from the centre of gravity and consequently the moment resisting the overturning couple of the vehicle is also increased.

By reason of the inherent stability of such a steering system, it is possible substantially to eliminate the "castor" action of the axle which, in normal steering systems, ensures stability thereof. Consequently, the points about which the front wheels pivot on the ground may be identical with the points of contact of the said wheels with the ground. The steering arrangement according to the invention therefore affords the additional advantage of reducing wear on the tires.

It will be obvious that such a steering arrangement could, if desired, be mounted at the rear of a vehicle in cases where the front wheels are the driving wheels and are mounted on a fixed axle. Similarly, such a steering arrangement could be provided both at the front and at the rear in the case of vehicles having four steerable wheels and possibly four driving wheels.

Naturally, modifications may be made to the arrangement hereinbefore described, notably by substitution of equivalent technical means, without departing from the scope of the present invention.

What I claim and desire to secure by Letters Patent is:

1. In a motor-vehicle having a steering wheel: a front axle, swivellable stub axles mounted at each end of the said front axle, wheels mounted on the said stub axles, a chassis movable along the said front axle, means operatively connected with the steering wheel for moving the said chassis along the said front axle when the steering wheel is turned, and articulated connecting means between the said swivellable stub axles and the chassis whereby a transverse movement of the chassis towards one side of the front axle orients the said wheels in the direction which would make the vehicle move towards this side.

2. In a motor-vehicle having a steering wheel: a front axle with a longitudinal rack thereon, swivellable stub axles mounted at each end of the said front axle, wheels mounted on the said stub axles, a chassis movable along the said front axle, a toothed member in mesh with said rack and operatively connected with the steering wheel for moving the said chassis along the said front axle when the steering wheel is turned, and articulated connecting means between the said swivellable stub axles and the chassis whereby a transverse movement of the chassis towards one side of the front axle orients the said wheels in the direction which would make the vehicle move toward this side.

3. In a motor-vehicle having a steering wheel: a front axle, swivellable stub axles mounted at each end of the said front axle, wheels mounted on the said stub axles, a chassis movable along the said front axle, a hydraulic double-acting servo-motor controlled by the steering wheel and adapted to move the said chassis along the said front axle when the steering wheel is turned, and articulated connecting means between the said swivellable stub axles and the chassis whereby a transverse movement of the chassis towards one side of the front axle orients the said wheels in the direction which would make the vehicle move towards this side.

4. In a motor-vehicle having a steering wheel: a front axle of general circular form in the horizontal plane with its concavity directed towards the front, swivellable stub axles mounted at each end of the said front axle, wheels mounted on the said stub axles, a chassis movable along the said front axle, means operatively connected with the steering wheel for moving the said chassis along the said front axle when the steering wheel is turned, and articulated connecting means between the said swivellable stub axles and the chassis whereby a transverse movement of the chassis towards one side of the front axle orients the said wheels in the direction which would make the vehicle move towards this side.

5. In a motor-vehicle having a steering wheel: a front axle, a chassis transversely slidable within plain bearings mounted on the said front axle, roller bearings having rollers disposed in contact with the upper and rear faces of those parts of the axle which are disposed in the plain bearings, swivellable stub axles mounted at each end of the said front axle, wheels mounted on the said stub axles, means operatively connected with the steering wheel for moving the said chassis along the said front axle when the steering wheel is turned, and articulated connecting means between the said swivellable stub axles and the chassis whereby a transverse movement of the chassis towards one side of the front axle orients the said wheels in the direction which would make the vehicle move toward this side.

6. In a motor-vehicle having a steering wheel: a front axle of general circular form in the horizontal plane with its concavity directed towards the front, a longitudinal rack on the said front axle, swivellable stub axles mounted at each end of the said front axle, wheels mounted on the said stub axles, a chassis movable along the said front axle, a toothed member in mesh with said rack and operatively connected with the steering wheel for moving the said chassis along the said front axle when the steering wheel is turned, and articulated connecting means between the said swivellable stub axles and the chassis whereby a transverse movement of the chassis towards one side of the front axle orients the said wheels in the direction which would make the vehicle move towards this side.

7. In a motor-vehicle having a steering wheel: a front axle, swivellable stub axles mounted at each end of the said front axle, wheels mounted on the said stub axles, a chassis movable along the said front axle, means operatively connected with the steering wheel for moving the said chassis along the said front axle when the steering wheel is turned, members rigidly connected to and extending forwardly of the stub axle mountings, and steering rods pivoted to the said members and to the vehicle chassis.

8. In a motor-vehicle having a steering wheel: a transverse axle, swivellable stub axles mounted at each end of the said transverse axle, wheels mounted on the said stub axles, a chassis movable along the said transverse axle, means operatively connected with the steering wheel for moving the said chassis along the said transverse axle when the steering wheel is turned, and articulated connecting means between the said swivellable stub axles and the chassis whereby a transverse movement of the chassis towards one side of the said transverse axle orients the said wheels in the direction which would make the vehicle move towards this side.

References Cited in the file of this patent

UNITED STATES PATENTS

| | | |
|---|---|---|
| 984,450 | Stipe | Feb. 14, 1911 |
| 1,279,853 | Enelo | Sept. 24, 1918 |
| 1,697,285 | Neighbour | Jan. 1, 1929 |
| 1,834,675 | Booth | Dec. 1, 1931 |
| 2,262,289 | Kolbe | Nov. 11, 1941 |
| 2,641,480 | Bancroft | June 9, 1953 |